J. WILSON.
Improvement in Earth-Augers.
No. 132,611. Patented Oct. 29, 1872.
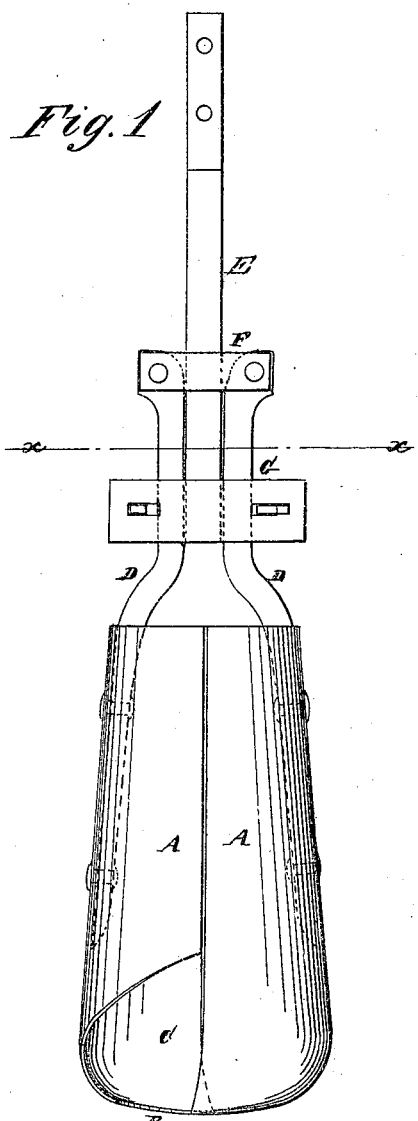
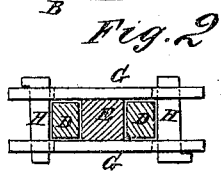
Witnesses:
A. W. Almqvist
C. Sedgwick
Inventor:
J. Wilson
per
Attorneys.

UNITED STATES PATENT OFFICE.

JOSEPH WILSON, OF CAMERON, MISSOURI, ASSIGNOR TO HIMSELF AND LEWIS A. BING, OF SAME PLACE.

IMPROVEMENT IN EARTH-AUGERS.

Specification forming part of Letters Patent No. 132,611, dated October 29, 1872.

*To all whom it may concern:*

Be it known that I, JOSEPH WILSON, of Cameron, in the county of Clinton and State of Missouri, have invented a new and useful Improvement in Earth-Augers, of which the following is a specification:

This invention relates to augers for boring wells; and consists in the construction and arrangement of parts, hereinafter described.

In the accompanying drawing, Figure 1 is a side view of the auger, showing the general construction and arrangement of parts; Fig. 2 is a cross-section of Fig. 1 taken on the line $x\ x$, and looking down from that line.

Similar letters of reference indicate corresponding parts.

This auger consists of two semicircular tapering pods, A A, with each a cutting-lip, B, and opening C, securely riveted or fastened to the arms D. E is the shank of the auger. Securely fastened, by brazing or otherwise, to the sides of the shank are two pairs of cross-plates, F and G. To the upper pair F the ends of the arms D are jointed, so that the parts of the pod may be separated when the auger is raised and the inclosed earth may be released.

The pods are held together, when the auger is in operation, by means of the other pair of cross-plates G, the ends of which have slot-holes for the keys H H, as seen in Fig. 2. By means of these keys the pods A A are held in close contact with each other, so that they form a round hollow cylinder sufficiently tapering to allow it to be revolved in the earth with but little friction. When the auger is full it is withdrawn, and one of the keys H (there may be one or two of these keys) is knocked out, which allows the pods to be separated and the earth discharged. After thus clearing the auger the key is replaced and the boring is continued.

I do not broadly claim an earth-auger constructed so that the cutting-parts separate, as I am aware that it is not new.

Having thus described my invention, I claim as new and desire to secure by Letters Patent—

An earth-auger consisting of the pods A A, arms D D, shank E, plates F and G, and keys H H, (one or more,) arranged substantially as shown and described.

JOSEPH WILSON.

Witnesses:
ROBERT CALDWELL,
THOS. C. HAMBAUGH.